(12) United States Patent
Sugiyama et al.

(10) Patent No.: US 7,031,813 B2
(45) Date of Patent: Apr. 18, 2006

(54) ELECTRIC STEERING CONTROL DEVICE

(75) Inventors: Michiyuki Sugiyama, Toyota (JP); Hirozumi Eki, Okazaki (JP); Kazumasa Kodama, Toyota (JP); Junji Kawamuro, Susono (JP); Takahiro Kojo, Susono (JP); Masatoshi Nakatsu, Susono (JP)

(73) Assignees: Toyoda Koki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 262 days.

(21) Appl. No.: 10/712,321

(22) Filed: Nov. 14, 2003

(65) Prior Publication Data

US 2004/0148079 A1 Jul. 29, 2004

(30) Foreign Application Priority Data

Nov. 14, 2002 (JP) .............................. 2002-330361

(51) Int. Cl.
*A01B 69/00* (2006.01)
(52) U.S. Cl. ........................................ 701/41; 180/446
(58) Field of Classification Search ................... 701/1, 701/22, 3, 41, 43, 44; 180/443, 446, 444; 361/161, 211
See application file for complete search history.

(56) References Cited

U.S. PATENT DOCUMENTS

| | | | |
|---|---|---|---|
| 6,326,753 B1 | 12/2001 | Someya et al. | |
| 6,334,503 B1 | 1/2002 | Fukumura et al. | |
| 6,520,279 B1 * | 2/2003 | Fukumoto et al. | 180/446 |
| 6,564,136 B1 * | 5/2003 | Asumi et al. | 701/70 |
| 6,564,139 B1 * | 5/2003 | Sakakiyama | 701/89 |
| 6,859,693 B1 * | 2/2005 | Tamagawa et al. | 701/22 |
| 6,860,361 B1 * | 3/2005 | Takatsuka et al. | 180/446 |
| 6,902,028 B1 * | 6/2005 | Takatsuka et al. | 180/446 |
| 2002/0014877 A1 | 2/2002 | Kaji et al. | |

FOREIGN PATENT DOCUMENTS

| | | |
|---|---|---|
| DE | 199 02 516 A1 | 8/1999 |
| EP | 1 120 805 A2 | 8/2001 |
| JP | 2001-253357 | 9/2001 |
| JP | 2002-53050 | 2/2002 |
| JP | 2002-136182 | 5/2002 |

* cited by examiner

*Primary Examiner*—Richard M. Camby
(74) *Attorney, Agent, or Firm*—Oblon, Spivak, McClelland, Maier & Neustadt, P.C.

(57) ABSTRACT

An electric steering control device is provided which is capable of enabling the driver to perform steering manipulation stably without being substantially affected by the ambient temperature and the heat generation of the control device. The control device comprises a temperature sensor for detecting the temperature of a circuit board mounting a motor drive circuit thereon and a compensation section for compensating an electric current command value based on the board temperature detected by the temperature sensor, so that en electric motor for exerting an assist force on a vehicle steering mechanism is driven by the compensated electric current command value output from a motor drive circuit. Therefore, the steering operation can be done stably without being substantially affected by the ambient temperature and the heat generation of the control device. In particular, since the temperature sensor is arranged not on the motor drive circuit per se but on a circuit board mounting the motor drive circuit thereon, the freedom can be heightened in arranging the temperature sensor. Further, since the temperature sensor for heat control of a spiral cable provided on the electric motor is utilized also for compensation of the electric current command value, the components for the control device can be reduced in number.

8 Claims, 7 Drawing Sheets

ELECTRIC STEERING CONTROL DEVICE

INCORPORATION BY REFERENCE

This application is based on and claims priority under 35 U.S.C. sctn. 119 with respect to Japanese Application No. 2002-330361 filed on Nov. 14, 2002, the entire content of which is incorporated herein by reference.

BACKGROUND OF THE INVENTION

1. Field of the Invention

The present invention relates to an electric steering control device for controlling an electric motor in a vehicle steering system.

2. Discussion of the Related Art

In an electric steering control device known heretofore of this kind, an electric current command value depending on the vehicle driving state is generated in a command value generating section, and a drive current corresponding to the electric current command value is applied from a motor drive circuit to an electric motor thereby to supply a required torque to a steering mechanism. The motor drive circuit is of the construction that various electronic elements (e.g., FET: Field Effect Transistors) are operated in dependence on the current command value thereby to output the corresponding drive current, as described in Japanese unexamined, published patent application No. 2001-253357.

By the way, the aforementioned electronic elements provided in the motor drive circuit vary in their characteristics in dependence on the temperature thereof. Thus, the output characteristic of the motor drive circuit varies upon the heat generation of the electronic elements and changes in the ambient temperatur. However, the aforementioned electric steering control device in the prior art takes such a configuration as to determine the electric current command value independently of the temperature of the motor drive circuit, and therefore, it is liable to occur that the steering feeling is varied in dependence on the ambient temperature and the heat generation of the motor drive circuit itself.

SUMMARY OF THE INVENTION

Accordingly, it is a primary object of the present invention to provide an improved electric steering control device capable of enabling the driver to perform the steering manipulation stably without being substantially affected by the ambient temperature and the heat generation of a motor drive circuit.

Briefly, according to the present invention, there is provided an electric steering control device having a motor drive circuit for applying a drive electric current depending on an electric current command value, to an electric motor which supplies a torque to a steering mechanism of a motor vehicle; and a command value generating section for generating the electric current command value in dependence on the driving state of a vehicle. The control device comprises a temperature sensor for detecting th temperature of a circuit board mounting the motor drive circuit thereon: and a compensation section provided in the command value generating section for compensating the electric current command value based on the board temperatur detected by the temperature sensor.

With this construction, the electric current command value is compensated based on the temperature of the circuit board mounting the motor drive circuit thereon, whereby a torque which is hardly affected by the ambient temperature and the heat generation is supplied from the electric motor to a steering mechanism of the vehicle. Therefore, it can be realized that stable steering manipulation by the driver can be done without being substantially affected by the ambient temperature and the heat generation.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENT

Hereafter, a steering device 11 in the first embodiment according to the present invention will be described with reference to FIGS. 1 to 6. The steering device 11 in this embodiment is provided with a so-called "variable gear ratio system" (hereinafter referred simply as "VGRS") for varying the steered angle of the steered wheels 20, 20 (e.g., front wheels of the vehicle) relative to the rotational angle of a steering wheel 12, in dependence on the vehicle speed.

Figure 1:
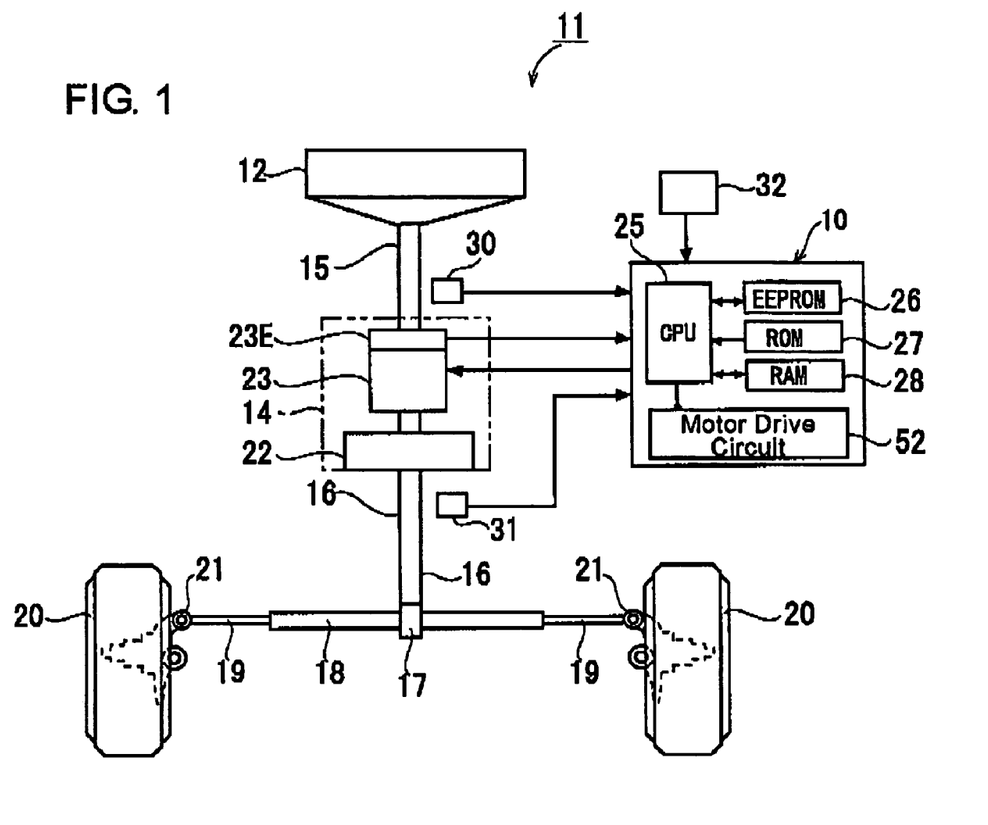
FIG. 1 is a schematic view showing the general construction of a steering device in the first embodiment according to the present invention.

The primary part of the VGRS is composed of a gear ratio varying unit 14, whose input part is connected to an input side st ering shaft 15, and whos output part is connected to an output side steering shaft 16. The steering wheel 12 is secured to one end of the input side steering shaft 15. A steering angle sensor 30 is provided for detecting the rotational angle (hereinafter referred to as "steering angle θ1") of th steering wheel 12 or the input side steering shaft 15

On the other hand, an ACT (actuator) rotational angle sensor 31 is provided for detecting the rotational angle (hereafter referred to as "ACT angle θ2") of the output side steering shaft 16. One end of the output side steering shaft 16 is connected to a pinion gear 17, which is in meshing engagement with a rack 18 extending between the steered wheels 20, 20. Extending from opposite ends of the rack 18 are tie rods 19, 19, which are linked with rotation support parts 21, 21 for the left and right steered wheels 20, 20. Thus, the steered angle of the left and right steered wheels 20, 20 is varied in connection with the rotation of the output side steering shaft 16.

Figure 2:
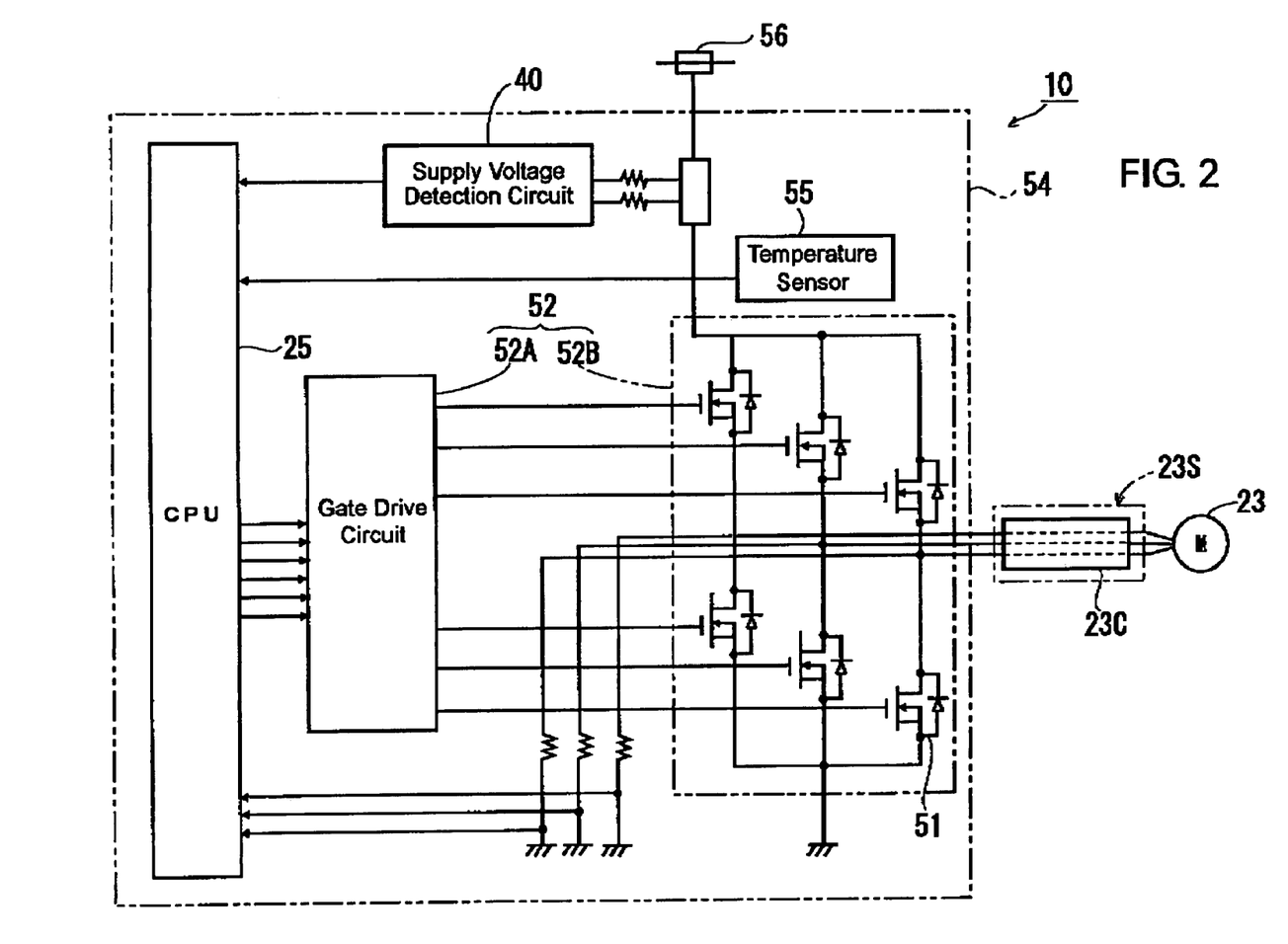
FIG. 2 is a circuit diagram showing a motor drive circuit.

The gear ratio varying unit 14 is of the construction that a reduction g ar mechanism 22 for differentially connecting the input side steering shaft 15 with the output side steering shaft 16 is driven by an electric motor 23. And, the electric motor 23 can be drivingly controllable by an electronic control unit (hereafter simply as "ECU") 10 which constitutes the electric steering control device according to the present invention, Specifically, the electric motor 23 is a three-phase brushless motor, for example, and is driven by a motor drive circuit 52 incorporated in the ECU 10. The motor drive circuit 52 is shown in FIG. 2 in detail and comprises a three-phase bridge circuit 52B having plural FETs (Field-Effect Transistors) 51 as switching elements and a gate drive circuit 52A. The gate drive circuit 52A sets each of the EFTs 51 ON or Off based on output signals from a CPU (central processing unit which corresponds to a command value generating section as recited in the claimed invention) 25 provided in the ECU 10. Thus, a pulse-wave signal is generated from the output voltage of a motor power supply 56 connected to the three-phase bridge circuit 52B. In this case, the CPU 25 varies the pulse width of the pulse-wave signal by executing the PWM (Pulse Width Modulation) control of th pulse-wave signal based on the current command value (i.e., duty ratio) as described hereinafter, whereby a drive electric current of three-phas alt rnating current corresponding to the current command value is applied from the motor driv circuit 52 to the electric motor 23.

Figure 3:
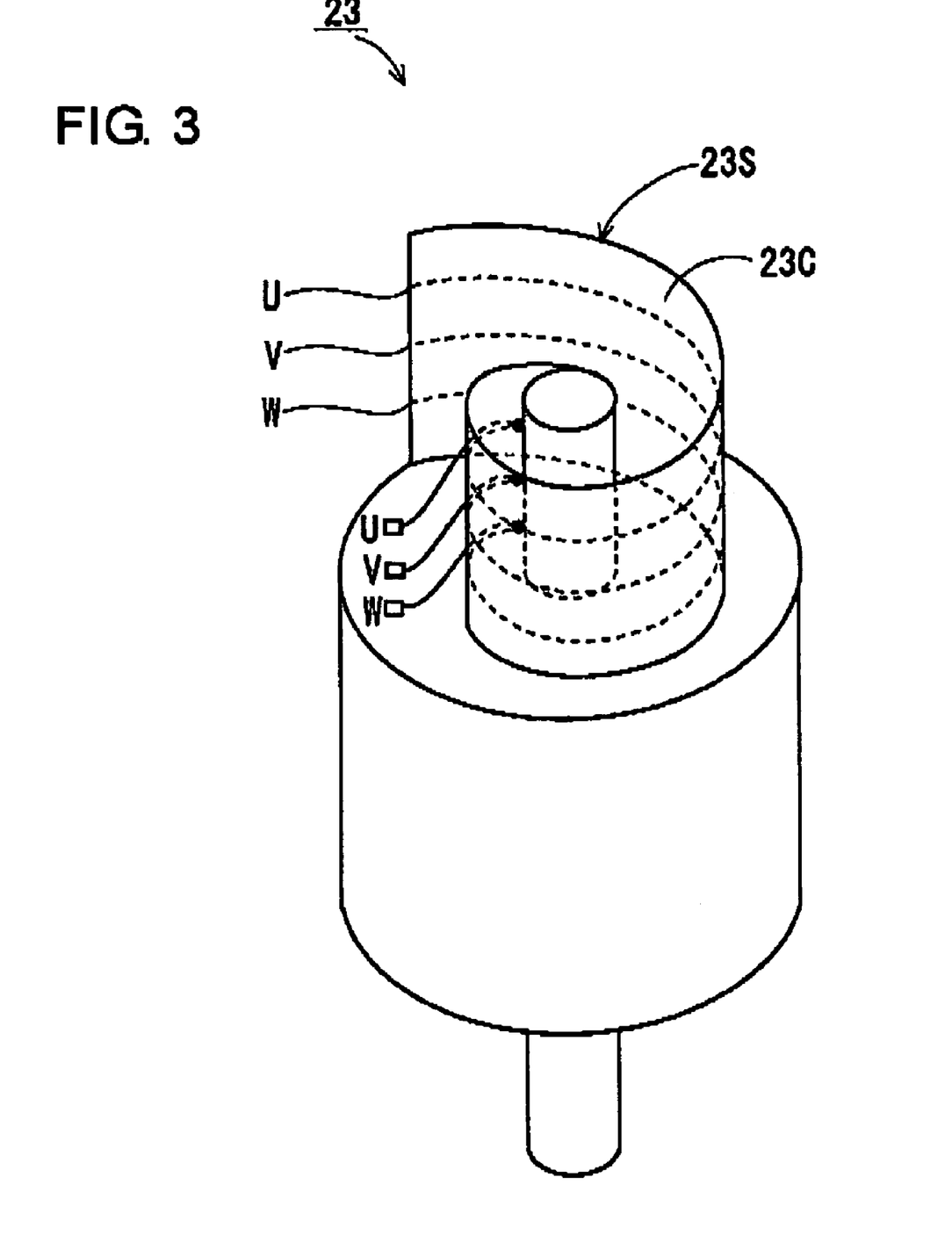
FIG. 3 is a perspective view showing a spiral cable provided on an electric motor.

The electric motor 23 in the particular embodiment is provided with a spiral cable 23S. As shown in FIG. 3, the spiral cable 23S is constituted in such a way that electrical paths which respectively constitute U, V and W-phases of the electric motor 23 are laid in parallel relation with one another on a FFC (Flexible Flat Cable designated by numeral 23C in FIGS. 2 and 3) and that the FFC with the electrical paths so arranged thereon is then wound in a spiral shape as shown in FIG. 3. The spiral cable 23S is secured to a stator (not shown) of the electric motor 23 at one end thereof and to an output shaft of the electric motor 23 at the other end thereof, so that it becomes possible to supply electric power to a rotor (not shown) of the electric motor 23. As the rotor is rotated, the spiral cable 23c is contracted or loosened, so that a load exerted onto the electric paths for the U, V and W-phases can be reduced.

As become aware of, since the spiral cable 23S is the weakest portion on the electrical path to the electric motor 23, care must be taken not to let the spiral cable 23S be heated over a prescribed temperature, it is to be noted that the spiral cable 23S and the motor drive circuit 62 have the same electric current to pass therethrough and hence, have the relationship that the temperatures thereof vary together. Therefore, the temperature of a circuit board 54 of the ECU 10 rises with the heat generation of th motor drive circuit 52. To cope with this, as shown in FIG. 2, the circuit board 54 incorporates a temperature sensor 55 therein so that the heat generation of the spiral cable 23S can be controlled in dependence on the detection result of the temperature sensor 55.

Figure 4:
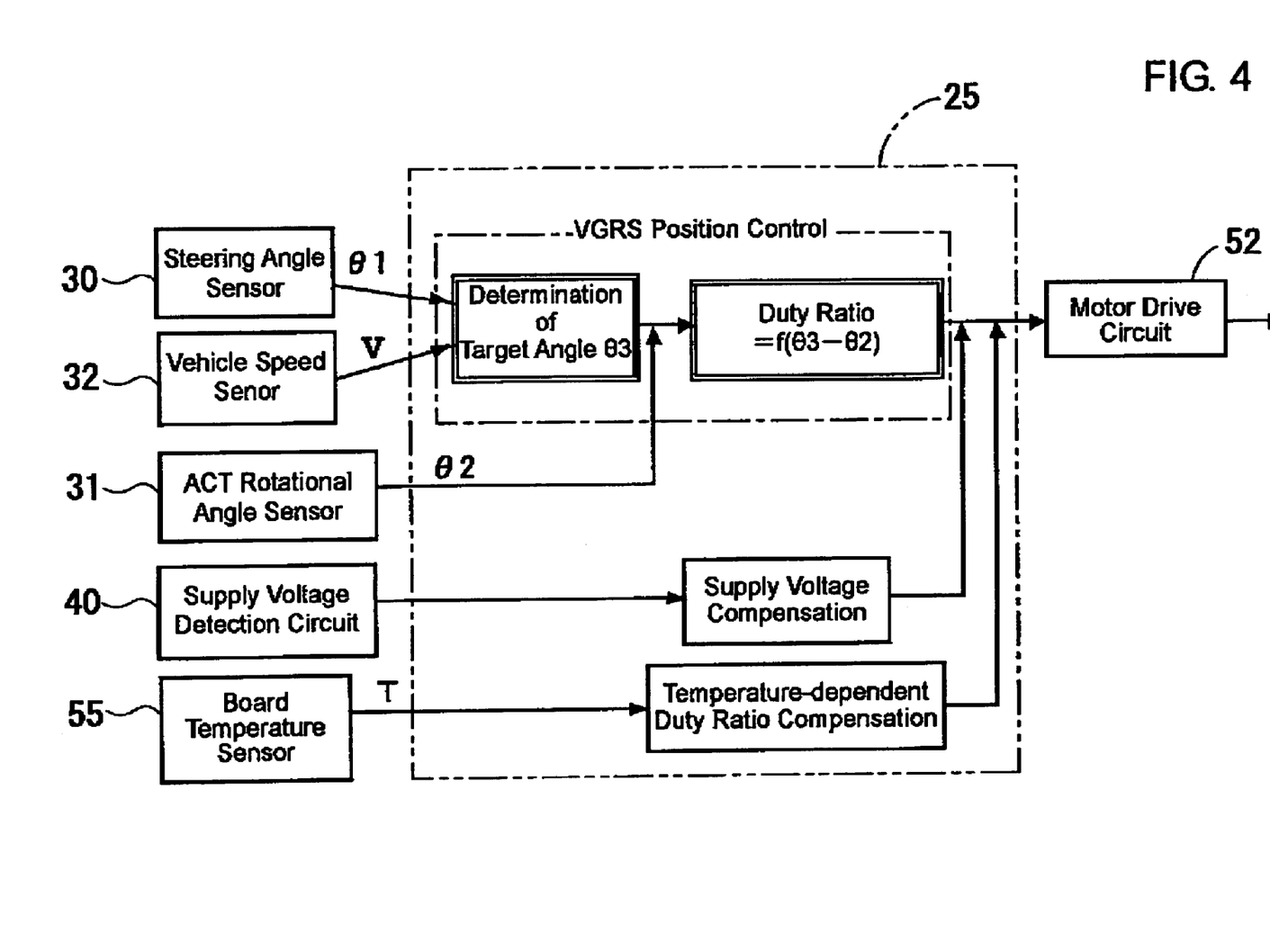
FIG. 4 is a block diagram showing the construction for generating a curr nt command value.

As shown in FIG. 4, into the CPU 25 there are taken a vehicle speed V detected by a vehicle speed sensor 32, the steering angle θ1 detected by the steering angle sensor 30 and the ACT angle θ2 detected by the ACT angle sensor 31. The CPU 25 calculates a target angle (i.e., rotational angle command value) θ63 and an electric current command value for the electric motor 23 in dependence on the driving state of the vehicle. Specifically, a ROM 27 (shown in FIG. 1) provided in th ECU 10 has stored a motor rotational angle characteristic map (not shown) therein, and by reference to the motor rotational angle characteristic map, the CPU 25 repetitiv ly determines the rotational angle for the electric motor 23 based on the vehicle speed V and the steering angle θ1 at a predetermined time interval (i.e., 10 milliseconds). The motor rotational angle characteristic map defines the variation in the target angle θ3 in relation to increases in the vehicle speed V, so that the target angle θ3 can be determined directly in dependence on the vehicle speed V detected by the vehicle speed sensor 32. Then, the duty ratio as the electric current command value recited in the claimed invention is determined by multiplying a predetermined parameter or constant for example with the differential angle (=θ3−θ2) between the determined target angle θ3 and the detected ACT angle θ2. Then, an electric current corresponding to the electric current command value (duty ratio) is applied from the motor drive circuit 52 to the electric motor 23 thereby to operate the same, and feedback control is executed in such a way that the difference between a motor output rotational angle detected by an encoder 23E of the electric motor 23 and the determined target angle θ3 is converged to a small value, i.e., zero.

As a result, the rotational amount of the output part of the gear ratio varying unit 14 (i.e., the output side steering shaft 16) relative to the rotational amount of the input part thereof (i.e., the input side steering shaft 15) is altered or varied on a real time basis. That is, the reduction gear ratio (=output rotation/input rotation) of the gear ratio varying unit 14 can be varied in dependence on the vehicle speed V, and therefore, the steered angle of the steered wheels 20, 20 is altered relative to the steering angle θ1 of the steering wheel 12. In the concrete, during a slow speed traveling for example, the steered angle of the steered wheels 20, 20 relative to the steering angle θ1 of the steering wheel 12 becomes relatively large to make the parking manipulation or the like easier. On the contrary, during a high speed traveling, the steered angle of the steered wheels 20, 20 relative to the steering angle θ1 of the steering wheel 12 becomes relatively small to make a sharp over-steering unable to do at a high speed range.

Further, in this particular embodiment, in order to realize a stable steering feeling which is hardly influenced by the disturbances, the following two compensations are made on the electrical current command value (i.e., the duty ratio) determined as aforementioned. Specifically, the output voltage of the motor power supply 56 is detected by a supply voltage detection circuit 40 shown in FIG. 2 and is taken into the CPU 25. Thus, when the output voltage of the motor power supply 56 drops, the CPU 25 performs such a compensation that the pulse width is widened to compensate for such voltage drop.

In this particular embodiment, another compensation concerning the temperature variation of the motor drive circuit 52 is performed in addition to the aforementioned voltage-drop compensation. Each of the FETs has a temperature characteristic that the resistance between the drain and source terminals while it is turned ON decreases as the temperature thereof increases. To cope with this, the temperature of the circuit board 54 mounting the motor drive circuit 52 thereon is detected by the temperature sensor 55 to be taken into the CPU 25, and the CPU 25 increases the duty ratio thereby to enlarge the pulse width while the board temperature remains equal to or lower than a reference temperature, but decreases the duty ratio thereby to narrow the pulse width while the board temperature rises beyond the reference temperature. By so doing, the CPU 25 can restrain the influence by the variation in the board temperature.

Figure 5:
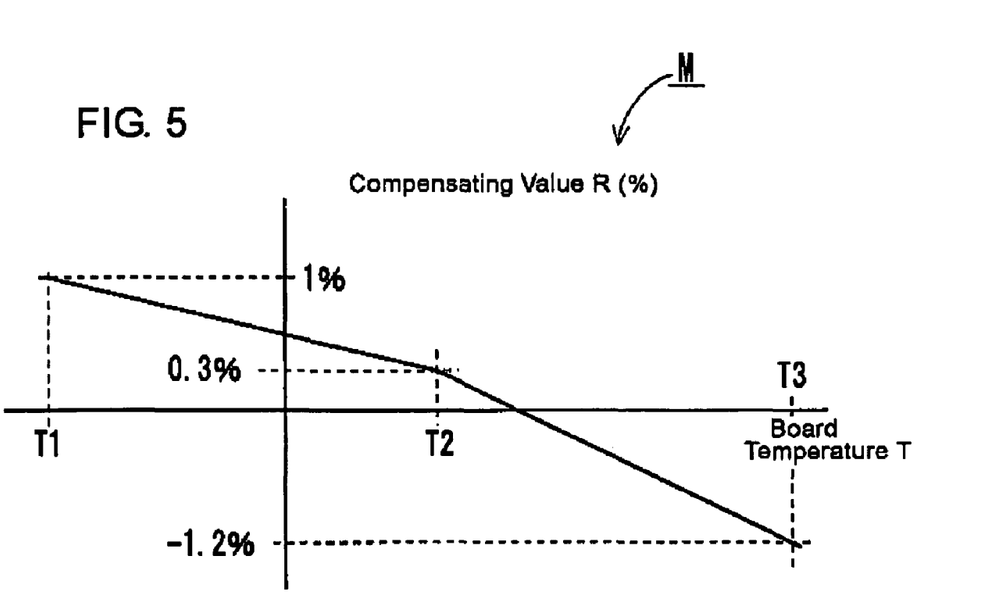
FIG. 5 is a graph showing the relationship between the board temperature and the compensating value.

More specifically, a RAM 28 (shown in FIG. 1) incorporated in the ECU 10 has stored therein a compensation map M which is conceptually represented in Figur 5. The CPU 25 reads out a compensating value R from the compensation map M in dependence on the board temperature detected by the temperature sensor 55 and compensates the electric current command value by the use of the compensating value R. The compensation map M is of the configuration as described hereafter. That is, an experiment is carried out, wherein the circuit board 54 is maintained at the reference temperature, in which state there is first determined and measured a reference duty ratio which is required to output a reference electric current as designed to the electric motor 23. Two other duty ratios are then m asured each of which is required to output the reference electric current with the circuit board 54 being maintained at a corresponding one of other typical temperatures. Thus, three duty ratios together with respective board temperatures are stored in an EEPROM (Electrically Erasable Programmable Read-Only Memory) 26. The entirety of the compensation map M is generated from these duty ratios having been stored in the EEPROM 26. That is, duty ratios which are required to apply the same electric current as the reference electric current to the electric motor 23 at various temperatures of the circuit board 54 are obtained by calculation based on the typical duty rations. The aforementioned compensating values R(%) are determined based on the duty ratios obtained in this manner and are stored in the RAM 28 in correspondence respectively to the respective board temperatures, whereby the compensation map M is completed.

Thus, EEPROM 26 incorporated in the ECU 10 has stored therein some or several numbers of numerous compensating values R composing the compensation map M. When an ignition switch of the vehicle is turned ON, the whole or entirety of the compensation map M is generated based on such some compensating values and is stored in the RAM 28. The compensating values R having been stored in the EEPROM 26 are those which were actually measured on each of the steering control devices after the same are manufactured. In the concrete, stored in the EEPROM 26 are th coordinate data (reference temperature T and compensating value R) of, for example, three representative points of those constituting the compensation map M shown in FIG. 5.

Figure 6:
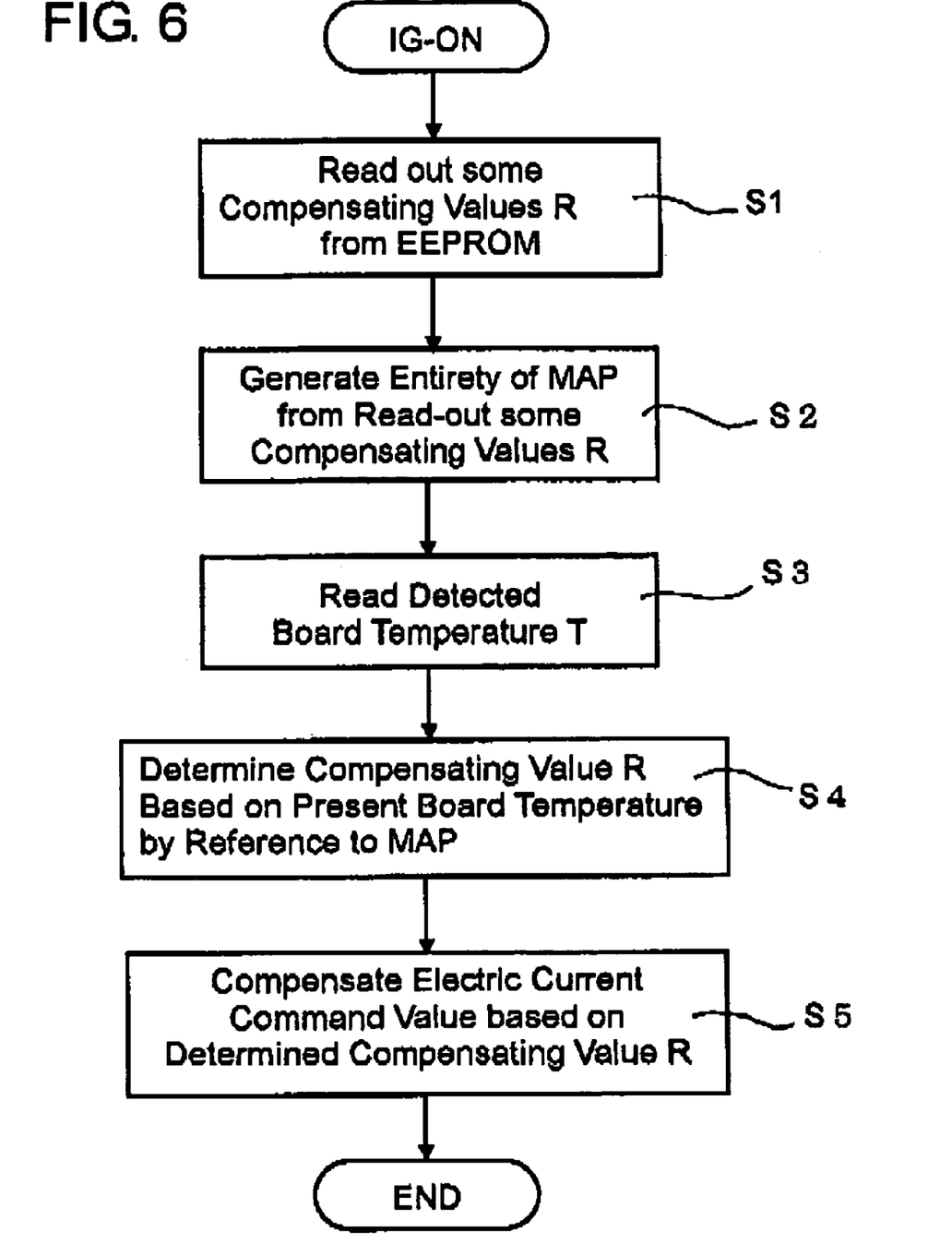
FIG. 6 is a flow chart for performing the compensation for the board temperature.

Next, the operation of the steering device 11 as constructed above in the first embodiment will be described hereinafter. As shown in FIG. 6, when the ignition switch (not shown) of the vehicle is turned ON, the CPU 25 reads out the coordinate data (board temperatures T and compensating values R) of the three representative compensating values R (Step S1) and calculates a series of coordinate data on a line or lines which connect these read-out coordinate data (board temperatures T and compensating values R) thereby to generate the ntirety of th compensation map M (Step S2).

Now, when the vehicle is brought into driving operation, the CPU 25 incorporated in the ECU 10 calculates an electric current command value (duty ratio) in dependence upon the driving state which is represented by the vehicle speed V, th steering angle θ1 and the like. Thus, a drive electric current corresponding to the electric current command value (duty ratio) is applied from the drive circuit 52 to the electric motor 23. Since each of the FETs 51 provided in the motor drive circuit 52 has the drain-source resistance which varies in dependence on the board temperature, that is, the temperature of itself mounted on the board 54, the temperature variation causes the drive electric current applied from the motor drive circuit 52 to vary.

However, the ECU 10 in this particular embodiment compensates the electric current command value based on the temperature of the circuit board 54 mounting the motor drive circuit 52 thereon. More specifically, the CPU 25 takes the board temperature T thereinto (Step S3) and determines a compensating value R(%) corresponding to the detected board temperature T by reference to the compensation map M. (Step S4) Then, the CPU 25 executes the temperature compensation of the electric current command value by the use of the compensating value R(%), whereby a drive electric current corresponding to the compensated electric current command value (duty ratio) is applied from the motor drive circuit 52 to the electric motor 23. (Step S5) in the concrete, the compensation is executed to make the electric current command value (duty ratio) smaller when the temperature of the board 54 is higher than the reference temperature, but larger when the board temperature is lower than it. The influence by the temperature variation on the drive electric current can be removed or excluded in this way, so that the electric motor 23 is enabled to apply to the steering mechanism the torque which is hardly influenced by the variation of the ambient temperature and the heat generation of the motor drive circuit 52.

As described hereinabove, in this particular embodiment, the ECU 10 executes the temperature compensation on the electric current command value for driving the electric motor 23 and enables the driver to perform the steering manipulation stably without being substantially affected by th variation of the ambient temperature and the heat generation of the motor drive circuit 52. Further, since the temperature sensor 55 is arranged not on the motor drive circuit 52 per se but on the circuit board 54 mounting the motor drive circuit 52 thereon, the freedom can be heightened in arranging the temperature sensor 55. In addition, the temperature sensor 55 is utilized not only for the temperature control of the spiral cable 23S provided on the electric motor 23 but also for the compensation of the electric current command value, there can be attain d a decrease in number of the components.

Furthermore, since some of the compensating values R have been stored in the EEPROM 26 and since the entirety of the compensation map M is generated from such some compensating values R, the memory quantity necessary for the compensation map M can be reduced. Further, the entirety of the compensation map M can be altered easily only by altering the some of the compensating values R having been stored in the EEPROM 26. Further, since the compensation data having been stored in the EEPROM 26 is obtained through actual measurement on each ECU 10 after the manufacturing of the same, dispersion caused by the manufacturing can be restrained.

(Second Embodiment)

Although the present invention has been realized in the foregoing first embodiment directed to the ECU 10 for controlling the VGRS, it can also be realized in the second embodiment directed, as described hereinafter, to an ECU 72 for a so-called power steering device for controlling the assist force which an electric motor 23 generates in dependence upon the torque exerted on the steering shafts 13. Hereinafter, description will be made with reference to FIG. 7 as to only the parts in the second embodiment which are different from those in the first embodiment, wherein the same reference numerals as used in the first embodiment are put on the parts which are identical or correspond to those in the first embodiment, and the description of such parts is omitted for the sake of brevity.

Figure 7:
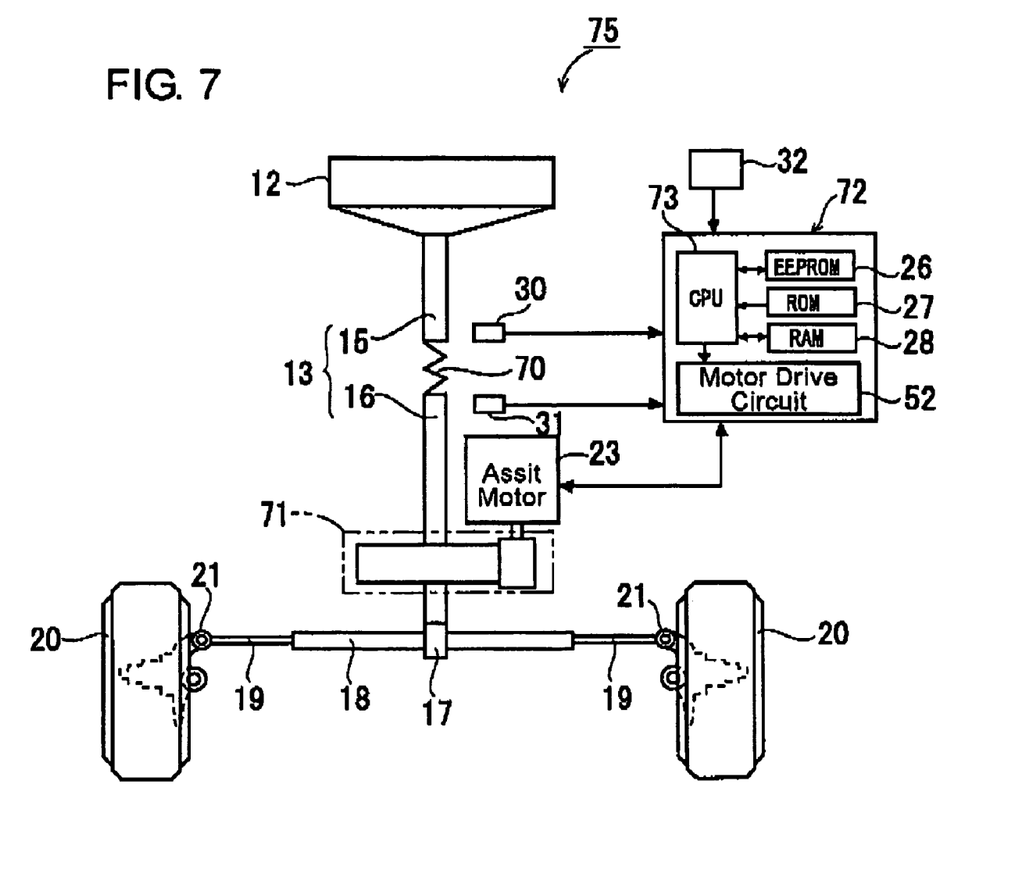
FIG. 7 is a schematic view showing another steering device in the second embodiment according to the present invention.

In the steering device 75 in this second embodiment, steering shafts 15 and 16 at input and output sides ar connected with each other through a torsion bar 70. The loaded torque Tr acting on th steering shafts 13 is detected based on the diff rential angle (=θ1−θ2) between a steering angle θ1 and an ACT angle θ2, the differential angle representing the twist amount of the torsion bar 70. The electric motor 23 is drivingly connected to a middle portion of the output side steering shaft 16 through a reduction mechanism 71. The output torque of the electric motor 23 is augmented in correspondence to the reduction ratio of the reduction mechanism 71 and is given to the steering shaft 16.

A CPU 73 provided in the ECU 72 in the second embodiment determines an electric current command value based on the vehicle speed V detected by a vehicle speed sensor 32 and the aforementioned loaded torque Tr. A ROM 27 provided in the ECU 72 has stored therein an electric current value map (not shown) wherein various electric current command values are selectively extracted directly from various parameters that various vehicle speeds V and various loaded torques determin in combination. The CPU 73 makes reference to the electric current value map and determines an electric current command value based on a detected vehicle speed V and a detected load torque Tr. Subsequently, in the same way as aforementioned in the first embodiment, the determined electric current is compensated in dependence on a detected board temperature T. And, a drive electric current corresponding to the compensated electric current command value is applied to the electric motor 23, whereby an assist force of the magnitude meeting the selected electric current command value is given to the steering mechanism. Accordingly, the steered wheels 20, 20 can be steered with the force which the manual steering force given by the driver and the assist force given by the electric motor 23 are added to become to.

In the second embodiment, the same functions and the same advantages as attained in the first embodiment described earlier can be effected by the ECU 72 of th steering device 11 as constructed above.

Various features and many of the attendant advantages in the foregoing embodiments will be summarized as follows:

In the first mbodiment typically shown in FIGS. 1, 2 and 4 for example, since the electric current command value is compensated based on the temperature T of the circuit board 54 mounting the motor drive circuit 52 thereon, a torque which is hardly affected by the variation of the ambient temperature and the heat generation of the motor drive circuit 52 is applied from the electric motor 23 to the steering mechanism of the vehicle. Therefore, it can be realized that the steering manipulation by the driver can be done stably without being substantially affected by the variation of the ambient temperature and the heat generation of the motor drive circuit 52.

In the foregoing first embodiment typically shown in FIG. 2 for example, since the temperature sensor 55 is used for heat control of a spiral cable 23S provided on the electric motor 23 as well as for compensation of the electric current command value, the components of the control device 10 can be reduced in number than the case wherein independent sensor are provided for such heat control as well as for such compensation.

In the foregoing first embodiment typically shown in FIGS. 1 and 5 for example, one of the compensating values R is read out from the compensation map M in dependence on the board temperature T detected by the temperature sensor 55, so that it can be realized to compensate the electric current command value output from the motor drive circuit 52 by the used of the read-out one compensating value R.

In the foregoing first embodiment typically shown in FIGS. 1 and 5 for example, since the entirety of the compensation map M is generated in the RAM 28 by reading out some compensating values R from the memory means EEPROM when the ignition switch is turned ON, there can be used memory means of a smaller capacity for storing such some compensating values R while the ignition switch is turned OFF. In addition, the entirety of the compensation map M can easily be altered only by altering such some compensating values R stored in the memory means EEPROM.

In the foregoing first embodiment typically shown in FIGS. 1 and 2 for example, since the compensating values R stored in the memory means EEPROM ar those which were actually measured on each of electrical steering control devices 10 after the same were manufactured, the dispersion caused by the manufacturing can be obviated.

(Modifications)

The present invention is not limited to those in the foregoing embodiments. For example, the modifications as enumerated below are encompassed in the technological scope of the present invention.

(1) Although the first embodiment is of the construction that when the ignition switch is turned ON, the entirety of the compensation map M is generated based on the several or some compensating values R having been stored in the EEPROM 26, the entire compensation map M may have been stored in the ROM regardless of the ON/OFF operation of the ignition switch.

(2) Although the first embodiment is of the construction that the compensating value R is selected from those of many by reference to the compensation map M, there may have been stored a calculation expression in place of the compensation map, and the compensating value (R) may be calculated by putting the board temperature into the calculation expression.

Obviously, numerous modifications and variations of the present invention are possible in light of the above teachings. It is therefore to be understood that within the scope of the appended claims, the present invention may be practiced otherwise than as specifically described herein.

What is claimed is:

1. An electric steering control device having a motor drive circuit for applying a drive electric current depending on an electric current command value, to an electric motor which supplies a torque to a steering mechanism of a motor vehicle and a command value generating section for generating said electric current command value in dependence on the driving state of said drive vehicle, said control device comprising:

a temperature sensor for detecting the temperature of a circuit board mounting said motor drive circuit thereon; and a compensation section provided in said command value generating section for compensating said electric current command value based on the board temperature detected by said temperature sensor, wherein: assuming that a symbol "X" represents an electric current command value which is required to apply a predetermined drive electric current to said electric motor when said circuit board is at a predetermined temperature and that another symbol "Y" represents an electric current command value which is required to apply said predetermined drive electric current to said electric motor when said circuit board is at each of various temperatures, a compensating value R calculated by the ratio of said X to said Y in correspondence respectively to said various temperatures of said circuit board increases or decreases said electric current command value output from said motor drive circuit to compensate said electric current command value.

2. The control device as set forth in claim 1, wherein said temperature sensor is used for heat control of a spiral cable provided on said electric motor as well as for compensation of said electric current command value.

3. The control device as set forth in claim 1, further comprising a compensation map for storing compensating values R, wherein said command value generating section reads out one of said compensating values R from said compensation map in dependence on said board temperature detected by said temperature sensor.

4. The control device as set forth in claim 1, further comprising a compensation map for storing compensating values R, wherein said command value generating section reads out one of said compensating values R from said compensation map in dependence on said board temperature detected by said temperature sensor.

5. The control device as set forth in claim 3, further comprising: a memory means for storing some of numerous numbers of said compensating values R composing said compensation map; and generation means for generating the entirety of said compensation map based on said some compensating values R stored in said memory means.

6. The control device as set forth in claim 4, further comprising;
   a memory means for storing some of numerous numbers of said compensating values R composing said compensation map; and
   generation means for generating the entirety of said compensation map based on said some compensating values R stored in said memory means.

7. The control device as set forth in claim 5, wherein said compensating values R stored in said memory means are obtained through actual measurement for the control device after the same was manufactured.

8. The control device as set forth in claim 6, wherein said compensating values R stored in said memory means are obtained through actual measurement for the control device after the same was manufactured.

* * * * *